(12) United States Patent
Vangara et al.

(10) Patent No.: US 9,742,759 B2
(45) Date of Patent: Aug. 22, 2017

(54) SEAMLESS AUTHENTICATION MECHANISM FOR USER PROCESSES AND WEB SERVICES RESIDING ON COMMON HOST

(71) Applicant: Symantec Corporation, Mountain View, CA (US)

(72) Inventors: Pandu Vangara, Morrisville, NC (US); Priyanka Luthra, Maharashtra (IN); Prada Venkatachalam, San Jose, CA (US)

(73) Assignee: Symantec Corporation, Mountain View, CA (US)

(*) Notice: Subject to any disclaimer, the term of this patent is extended or adjusted under 35 U.S.C. 154(b) by 4 days.

(21) Appl. No.: 14/293,660

(22) Filed: Jun. 2, 2014

(65) Prior Publication Data

US 2015/0350195 A1    Dec. 3, 2015

(51) Int. Cl.
*H04L 9/32* (2006.01)
*H04L 29/06* (2006.01)
*H04L 9/00* (2006.01)
*G06F 21/00* (2013.01)
*G06F 21/33* (2013.01)

(52) U.S. Cl.
CPC .......... *H04L 63/0823* (2013.01); *G06F 21/33* (2013.01); *H04L 9/3263* (2013.01); *H04L 9/3265* (2013.01); *H04L 9/3268* (2013.01)

(58) Field of Classification Search
CPC . H04L 63/0823; H04L 9/3263; H04L 9/3265; H04L 9/3268; G06F 21/33
USPC .......................... 713/168, 175, 176; 726/3–5
See application file for complete search history.

(56) References Cited

U.S. PATENT DOCUMENTS

| | | | | |
|---|---|---|---|---|
| 2006/0075219 A1* | 4/2006 | Callaghan | ........... | H04L 63/0823 713/156 |
| 2006/0075222 A1* | 4/2006 | Moloney | ............. | H04L 63/0823 713/156 |
| 2009/0228695 A1* | 9/2009 | Pathak | .................. | G06F 1/3203 713/1 |
| 2012/0259635 A1* | 10/2012 | Ekchian | ................. | G06Q 50/18 704/235 |

* cited by examiner

*Primary Examiner* — Alexander Lagor
(74) *Attorney, Agent, or Firm* — Patterson + Sheridan, LLP

(57) ABSTRACT

Techniques are presented herein for authenticating local process to a web service, both executing on a common host computer server. The local process may present a self-signed certificate to the web service. In response, the web service may identify a file system directory on the first computer server containing a file storing the self-signed certificate. If the subject information identifying the owner of the process matches file system metadata indicating an owner of the file, then the web service may consider the process as being authenticated to the web service.

17 Claims, 6 Drawing Sheets

SEAMLESS AUTHENTICATION MECHANISM FOR USER PROCESSES AND WEB SERVICES RESIDING ON COMMON HOST

BACKGROUND

Field

Embodiments of the invention provide a client authentication mechanism for user processes and web services present on a common host. More specifically, a local process may be authenticated based on a self-signed certificate and a logged-in context of the user executing the process. Doing so avoids requiring the user from having to explicitly provide either login credentials or a trusted third-party certificate.

Description of the Related Art

A variety of techniques are used to provide access to computing resources and applications. For example, enterprise applications are frequently exposed to clients using web services. Web services allow users to access an enterprise application using a web browser, which passes HTTP requests to the web service and renders the resulting responses. For example, REST (Representational State Transfer) is a stateless architecture which runs over HTTP. REST defines an architecture to present enterprise applications as a series of web pages. XML-RPC and SOAP provide other examples of web services frameworks used to expose enterprise computing applications using a web browser One common issue for web services is that an enterprise application needs to ensure that only authorized users and processes can access the computing resources exposed by a web service. For example, a REST application can require a user to provide access credentials to access a web service, such as a user name and password. Another approach is to provision a certificate on the both the client and server and to perform a mutual authentication using the certificates (e.g., establishing a mutually authenticated SSL session). This approach needs the web service to trust a signature included in the client certificate and requires that the certificate provisioned on the client be managed over a certificate lifecycle.

In some cases, a local process may want to access a web service exposed on a server. For example, an enterprise may deploy a script or other command line interface (e.g., a command line interface shell) on a server hosting the web service. The local process may invoke functions exposed by the web service (e.g., by invoking REST APIs). To do so, the local process needs a mechanism to authenticate itself to the web service. However, the local process may not have an interface for the client to enter a username and password or have a certificate issued by a trusted third-party certificate authority.

Further, a user interacting with a command line interface may have already been authenticated by the server hosting both the web service and the local application. In such cases, it is generally preferable to not ask a user to continually provide authentication credentials. Further still, in some cases, a user may wish to initiate a local process (e.g., as a script or regularly scheduled job) and not monitor the execution thereof. In such a case, the user does not want to monitor the execution of the local process simply to provide authentication credentials when the script accesses the web service.

SUMMARY

One embodiment presented herein includes a method for authenticating a process to a web service, both executing on the same computer server. This method may generally include receiving a self-signed certificate from the process. The self-signed certificate includes subject information identifying an owner of the process. This method may also include identifying a file system directory on the first computer server containing a file storing the self-signed certificate. Provided the subject information identifying the owner of the process matches file system metadata indicating an owner of the file, the web services considers the process as being authenticated to the web service. The file system directory may be writeable by any user of the first computer server. Also, file system permissions for the file system directory may be set such that only the owner of a file can modify or delete files written to the file system directory.

In a particular embodiment, the method may further include, after authenticating the process to the web service, performing, by the web service, one or more requests submitted by the process. The file system directory is writeable by any user of the first computer server and permissions set for the file system directory permit only the owner of a file to modify or delete files written to the file system directory. Further, in one embodiment, the method also includes determining that a hostname identified in the subject information matches a hostname of the computer server, prior to considering the process as being authenticated to the web service.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
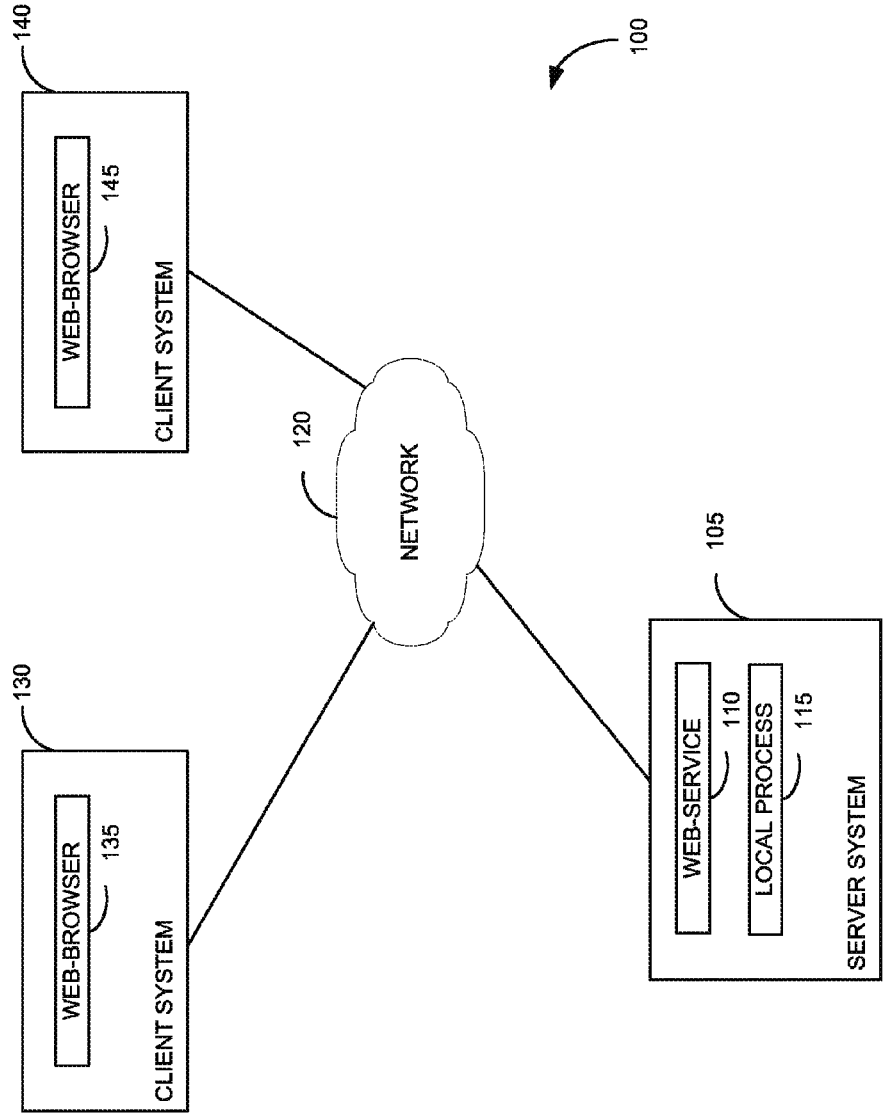
FIG. 1 illustrates an example computing environment, according to one embodiment.

Embodiments presented herein provide techniques for a web service to authenticate a local process based on a self-signed certificate and a logged-in context of the user executing the process. In one embodiment, the local process generates a self-signed digital certificate. The subject information in the self-signed certificate may identify the user which owns the local process and the hostname of the server. For example, a common name, organizational unit, and organization name may be set in the certificate as follows:

CN=<username>
OU=<hostname>
O=<localhost>

Once generated, the local process may store the certificate in a world-writeable directory which has directory permissions set to allow only the owner of a file to modify or remove files stored in the directory. That is, the certificate is stored in a directory to which any user can write, but one where each user can modify or delete only files in the directory owned by that user. In UNIX systems, this is commonly referred to as setting a "sticky bit" of the file permissions on the folder. Once the file is created, the operating system records the owner of the file as the user associated with the local process. Note, with the "sticky bit" enabled, a user can modify or delete the file containing the certificate, but cannot change the owner of the file listed in the file system metadata In one embodiment, the web service uses the self-signed certificate to perform an authentication process, as well as verify that the subject name information in the certificate matches file system metadata indicating the owner of the file in the world-writeable directory and hostname. As a result, the self-signed certificate can only be authenticated on the (i) same server where this credential was created (ii) for processes executed under the context of the user named in the certificate.

When the local process uses the certificate to authenticate itself to the web service, the web service validates the certificate as usual, but performs further processing to authenticate the local process. For example, the web service and the local process may establish a mutually authenticated SSL connection using a trusted third-party certificate issued to the web service (authenticating the web service to the local process) and using the self-signed certificate (authenticating the local process to the web service). However, to the web service, the SSL authentication alone is not trustworthy because any process could have written a self-signed certificate with any name into the world-writeable directory. Similarly, any external client could generate and present a self-signed certificate in an attempt to authenticate itself to the web service. Accordingly, to complete the authentication process, the web service retrieves a copy of the self-signed certificate from the "sticky bit" enabled directory. In one embodiment, the filename of the self-signed certificate may be based on a hash of the common name listed in the self-signed certificate. In such a case, the web-service may generate a hash value from the common name listed in the certificate presented by the local process. The web-service then looks for a file name which matches the hash value.

Once the file of the certificate is identified, the web service compares the username of the owner of the file with the username listed in the subject information of the self-signed certificate. If the common name (CN) in the certificate matches the name of the owner of the file, then the authentication is considered to be completed successfully and the web-service establishes a session with the process. The web service may also confirm that an organizational unit (OU) named in the certificate matches the hostname of the server hosting the web service.

Note, embodiments of the invention are described below for a computer server and file system using UNIX file system semantics, such as for a server running a distribution of the Linux® operating system, where permissions for a file system directory can have a "sticky bit" enabled. One of ordinary skill in the art will recognize that embodiments of the invention may be adapted for a variety of operating systems which support world-writeable directories, file ownership, and file system permissions that restrict the ability to modify or delete a given file contained in the world-writeable directory to the owner of that file.

FIG. 1 illustrates an example computing environment 100, according to one embodiment. As shown, the computing environment 100 includes a server system 105, a client system 130, and a client system 140, each connected to a network 120 (e.g. the internet). In this example, client systems 130, 140 include a web-browser 135, 145, used to access a web service 110 hosted by server system 105. The web service 110 may be an enterprise application exposed using as web pages rendered on browser 135, 145. For example, the web service 110 may be implemented as a set of REST (Representational State Transfer) APIs. Of course, web service 110 may be implemented using a variety of web service frameworks.

In one embodiment, the web service 110 may authenticate itself to clients systems 130, 140 using a digital certificate issued by trusted third-party. As known, a digital certificate is used to bind a public key named in the certificate to an identity. For example, a certificate may bind a name of the web service 110 to a public key. Provided the certificate was issued by a certificate authority trusted by web-browser 135, 145, the web-service 110 can "prove" its identity to the client systems 130, 140. Additionally, web-browser 135, 145 can provide credentials used to authenticate itself to the web service 110, e.g., using a trusted third party certificate or a username and password.

In addition to authenticating clients accessing the web service 110 over network 120, the web service 110 may also authenticate local process 115 executing on the server system 105. In one embodiment, the local process 115 may create a self-signed digital certificate presented to the web service 110 during the authentication process. The self-signed certificate may include subject information listing the username which owns local process 115 and a hostname of the server system 105. The self-signed certificate may be stored in a directory on the server system 105 which has a "sticky bit" enabled. That is, the self-signed certificate is stored in a directory that has world-writeable permissions (where any user can create a file in the directory), but that only allows the owner of a given file in the directory to modify or delete that file. This directory may be added to a set of trust directories used by the web service 110.

As described in greater detail below, the web service 110, may verify subject name information listed in the certificate with file system metadata obtained from the operating system running on server system 105 regarding the copy of the file stored in the directory having the "sticky bit" enabled. Doing so allows the web service 110 trust that the self-signed certificate was actually generated by local process 115 on the server system 105. If file system metadata confirms that the owner of the file storing the self-signed certificate matches the information in the self-signed certificate presented to the web service 110 by the local process 115, then the authentication process is considered to be successful.

Figure 2:
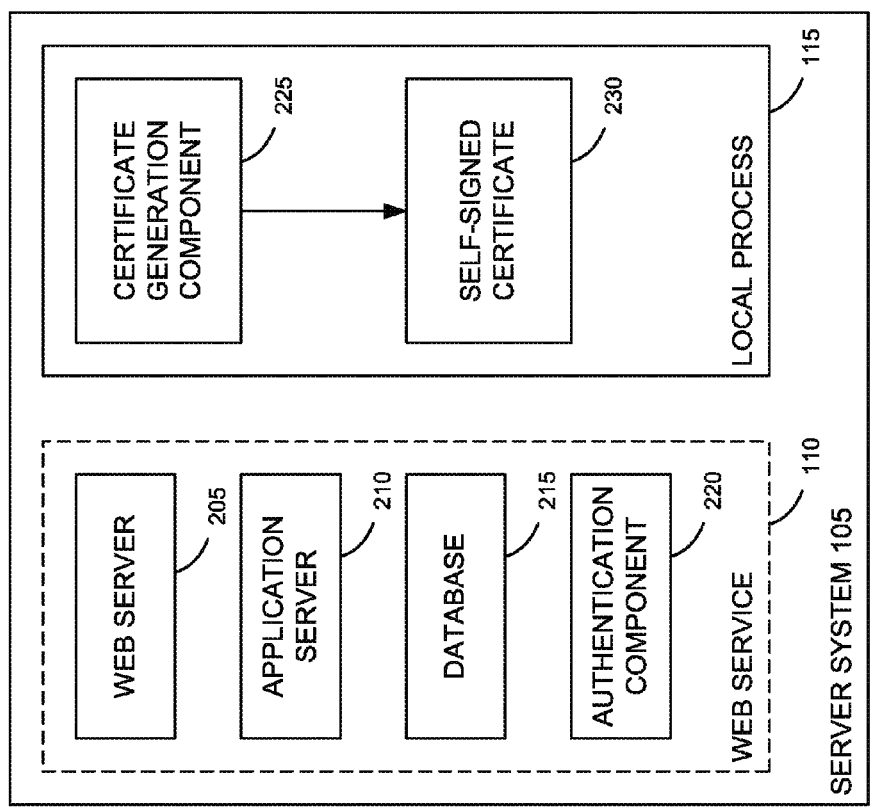
FIG. 2 illustrates application components used to authenticate a local process to a web service executing on a common host, according to one embodiment.

FIG. 2 illustrates application components used to authenticate a local process to a web service 110 executing on a common server system 105, according to one embodiment. As shown, the web service 110 is provided by a collection of software applications, including a web server 205, an application server 210, a database 215, and an authentication component 220. And the local process 115 includes a certificate generation component 225 and a self-signed certificate 230.

The web server 205 generally corresponds to one or more application programs used to receive and respond to HTTP requests from clients (e.g., from local processes 115 and web-browsers 135, 140 on external clients). For example, the web server 205 may receive a REST API call passed to application server 210. For example, the request could provide a URL interpreted by the application server 210 as a request for data. In turn, the application server 210 could retrieve data from database 215, which is passed by the web server 205 to the requesting client.

Web service 110 may be configured to only service requests from clients that can present credentials validated by the authentication component 220. For example, the authentication component 220 may validate a username and password supplied by an external client. In one embodiment, the authentication component 220 may also validate a self-signed certificate 230 created by certificate generation component 205. For example, the certificate generation component may be configured to generate a public/private key pair using a pseudorandom data source configured on server system 105. The resulting public key is stored in a certificate signed by the private key. As noted, the self-signed certificate 230 may include subject information listing a username under which local process 115 is executed and a hostname of the server system 105. In addition to performing an authentication process with the self-signed certificate 230 (e.g., a mutual SSL authentication between the web service 110 and the local process 115), the authentication component 230 may validate the subject information in the certificate against file system metadata as part of an extended authentication process.

The local process 115 may be any executable process, script, tool, or component installed on the server system 105. For example, in addition to a compiled binary executable, the local process 115 could be a script interpreted by a shell or other interpreter (e.g., a Java VM or python engine). The local process 115 could be invoked by a user directly, such as when a user interacts with a command line command line interface shell (e.g., a clish menu based application). Local process 115 could also be invoked by the operating system on server system 105 (e.g., as a regularly scheduled chron job). In the latter case, the local process 115 may be configured to dynamically generate the self-signed certificate as needed to access the web service 110. Doing so allows a user to schedule the local process for execution, but not require the user to supply authentication credentials (e.g., a username and password) when the job is executed or to cache such credentials on the server 105.

Note, the authentication component 220 is shown as a separate component for convenience. In practice, the authentication component 220 could be integrated with other components of the web service 110 (e.g., as part of the web server 205). Similarly, the certificate generation component 225 need not be integrated as part of local process 205. Instead, the local process 205 could invoke cryptographic and certificate generation tools installed on server system 105.

Figure 3:
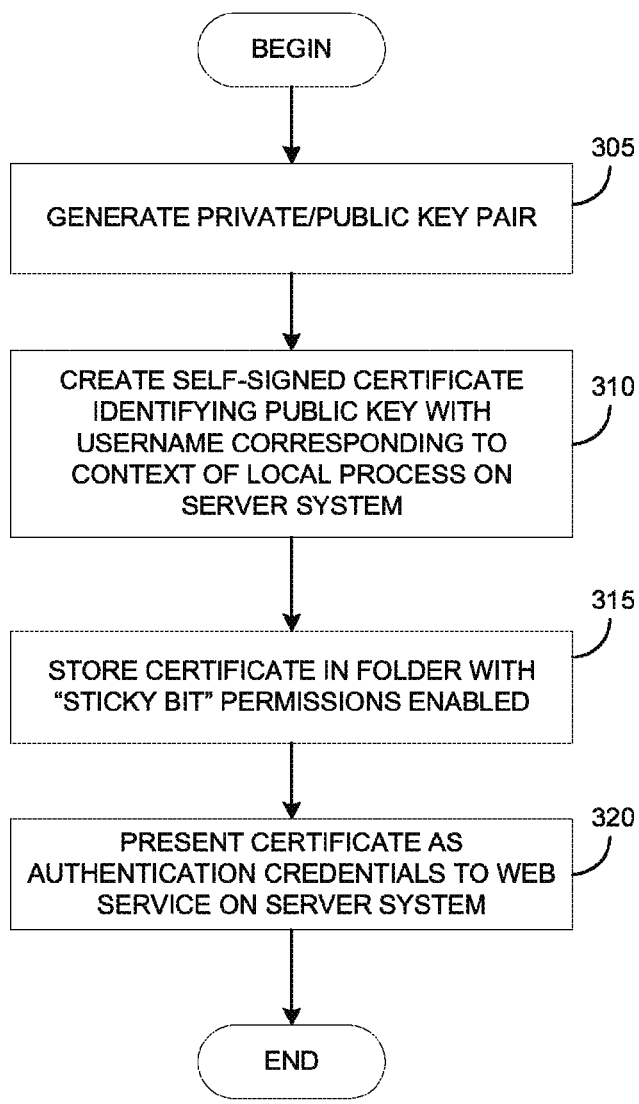
FIG. 3 illustrates a method for configuring an authentication mechanism on a server hosting a web service and local process, according to one embodiment.

FIG. 3 illustrates a method 300 for configuring an authentication mechanism on a server hosting a web service and local processes, according to one embodiment. As shown, the method 300 begins at step 305 where the local process generates a public/private key pair. At step 310, the local process creates a self signed certificate identifying the public key generated at step 305. The subject information in the certificate includes the username of the owner of the local process which will present the self-signed certificate to the web service and the hostname of the server on which both the local process and the web service are executing.

Figures 5A, 5B:
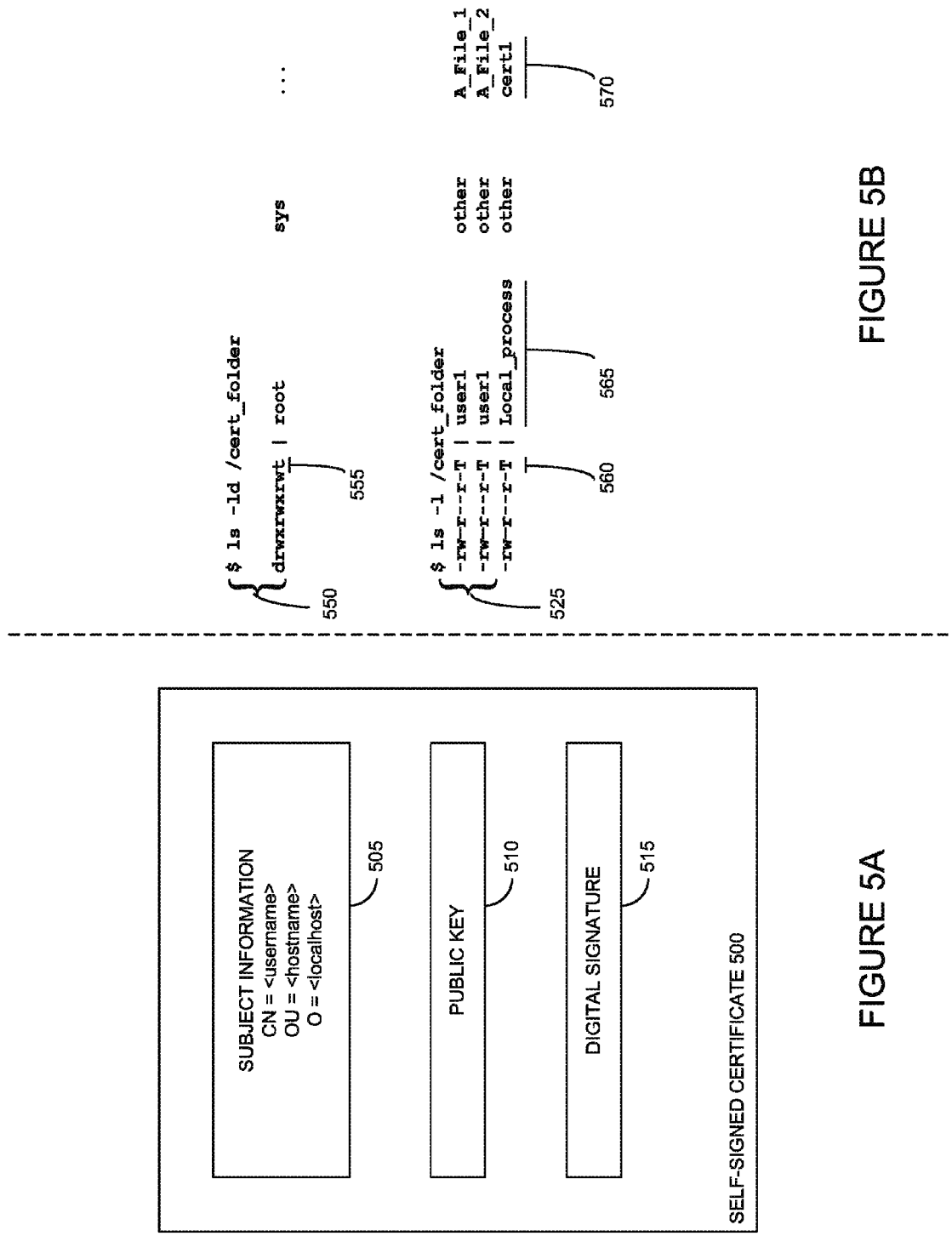
FIGS. 5A-5B illustrate examples of digital certificate data and shell command output, according to one embodiment.

For example, FIG. 5A illustrates an example of a self-signed digital certificate 500, according to one embodiment. As shown, the self-signed digital certificate 500 includes subject information 505, public key 510, and a digital signature 515. The subject information 505 may include a common name (CN), organizational unit (OU), and organization name (O). In one embodiment, the subject information in self-signed certificate 505 is set as follows: CN=<username>, OU=<hostname>, and O=<localhost>. The subject information may also include other attributes or use flags as needed for a particular case. The subject information 505 may also include an expiration date or validity period for the self-signed certificate 500. While the validity period may be set as a matter of preference, the self-certificate may have a relatively short period (e.g., one week).

The public key 510 corresponds to a private key held by the local process. In the case of a self-signed certificate, the public key 510 is signed using private key corresponding to the public key 510 named in the certificate 500. The resulting digital signature 515 is stored in the self-signed certificate 500. Digital certificate 500 binds a public key 505 to the subject information 505 listed in the certificate. However, because the private key is used to create digital signature 515, a user could include arbitrary data in the subject information 505. Thus, for a web service to rely on the binding between public key 510 and subject information 505, a second source of trust is needed.

Returning again to the method 300, at step 310, the local process stores the self-self signed certificate in directory on server which has the "sticky bit" set. As noted, the "sticky bit" creates a file permission state where, for a world-writeable directory, a user can modify or delete only the files they own within that directory. Additionally, once written to a directory with the "sticky bit" set, the user owning the file cannot change file system metadata identifying the owner of the file. In an alternative embodiment, the local process could create other credentials (e.g., a user name and password) to submit to the web service that could be stored in a file in the world-writeable directory.

At step 320, the local process presents the certificate to authenticate itself to a web service on the same server system which the local process is executed. In response, the web service may perform an authentication process using the self-signed certificate (e.g., a mutual SSL authentication). In one embodiment, the web service also verifies the subject information 505 listed in self-signed certificate 500 by comparing it with file system metadata. For example, FIG. 5B illustrates an example of shell command output using UNIX semantics for a "sticky bit" enabled directory. In one embodiment, the web service uses this information to verify the subject information listed in a digital certificate. As shown, a shell command 550 of "ls-ld/cert_folder" is executed to list the file permissions for a "cert_folder" directory. In response, the operating system returns permissions 555, which show that the "sticky bit" 555 has been set (denoted using a lowercase "t"). In addition, shell command 525 "ls-l/cert_folder" is executed to list the files in the "cert_folder" directory. In response, the operating system returns a list of files in this directory and their corresponding file permissions and ownership metadata. In one embodiment, the web service parses the files returned by shell command 525 to identify the file storing a copy of the self-signed certificate being presented for authentication purposes.

Assume for this example that the self-signed certificate is stored in a file 570 named "Cert 1". As shown in the directory listing, the sticky bit 560 is set for the file 570 (denoted by the capital "T") and the username 565 of the file owner is "local_process." Assuming the username listed in the subject information presented to the web service in the self-signed certificate matches the file system permissions and ownership metadata provided by the operating system, the web service can determine that the authentication process should be considered as successful. That is, the operating system permissions and metadata provide the second source of trust needed to complete the authentication process between the web service and the local process.

Figure 4:
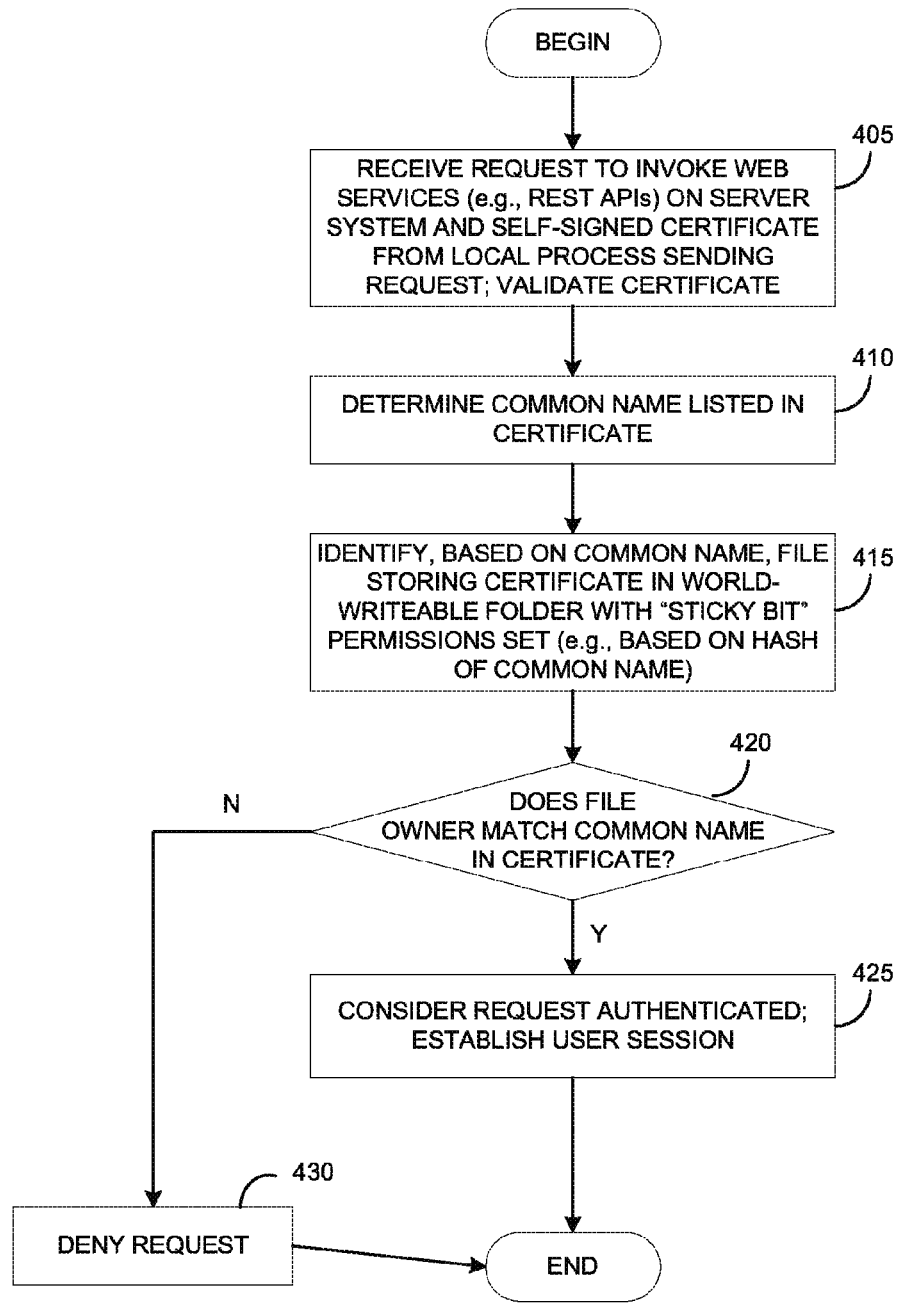
FIG. 4 illustrates a method for authenticating a local process requesting access to a web service executing on a common host, according to one embodiment.

FIG. 4 is a flow chart illustrating the method described above for authenticating a local process requesting access to a web service executing on a common host, according to one embodiment. As shown, method 400 begins at step 405 where a web service receives a request to invoke the web service along with a self-signed certificate presented to authenticate the local process making the request. The web service may validate the certificate—e.g., as part of a mutual SSL authentication process. At step 410, the web service determines a common name listed in the self-signed certificate. As noted, the common name may be set to match the username under which the local process is executing. Further, the common name may be used in generating a filename for the certificate, e.g., the filename may be a hash of the common name. The subject information of the certificate may also specify the hostname of the server system on which both the web service and local process are executing.

At step 415, the web service parses a directory with "sticky bit" permissions enabled to find the self-signed certificate. The name of the file may be based on the content of the certificate. As noted, e.g., the filename of the certificate may be based on a hash of the common name. Once identified the web service obtains file system metadata regarding the self-signed certificate to compare with the information in the certificate as presented by the local process. For example, the web service may execute shell commands or scripts in order to obtain the necessary information from the operating system hosting the web service and local process. In one embodiment, the web service may determine whether the certificate exactly matches the copy received over the SSL channel (i.e., the self-signed certificate presented by the application) before proceeding to match information in the self-signed certificate with file system metadata. For example, the web service may be matched with PEM file contents or matched against a hash (sha1) of the certificate.

At step 420, the web service determines whether the subject information in the self-signed certificate matches the file ownership metadata obtained from the operating system. If so, at step 425, the web service considers the local process as being successfully authenticated and establishes a user session between the web service and local process. For example, assuming the request was formatted as a REST API, the web service may obtain and return data used by the local process. Further, so long as the session remains active, the web service may respond to requests from the local process without needing to repeat the authentication process described above. If the file system metadata does not match the subject information listed in the certificate presented by the local process, then the web service considers the authentication process to have failed and rejects the request (step 430).

Figure 6:
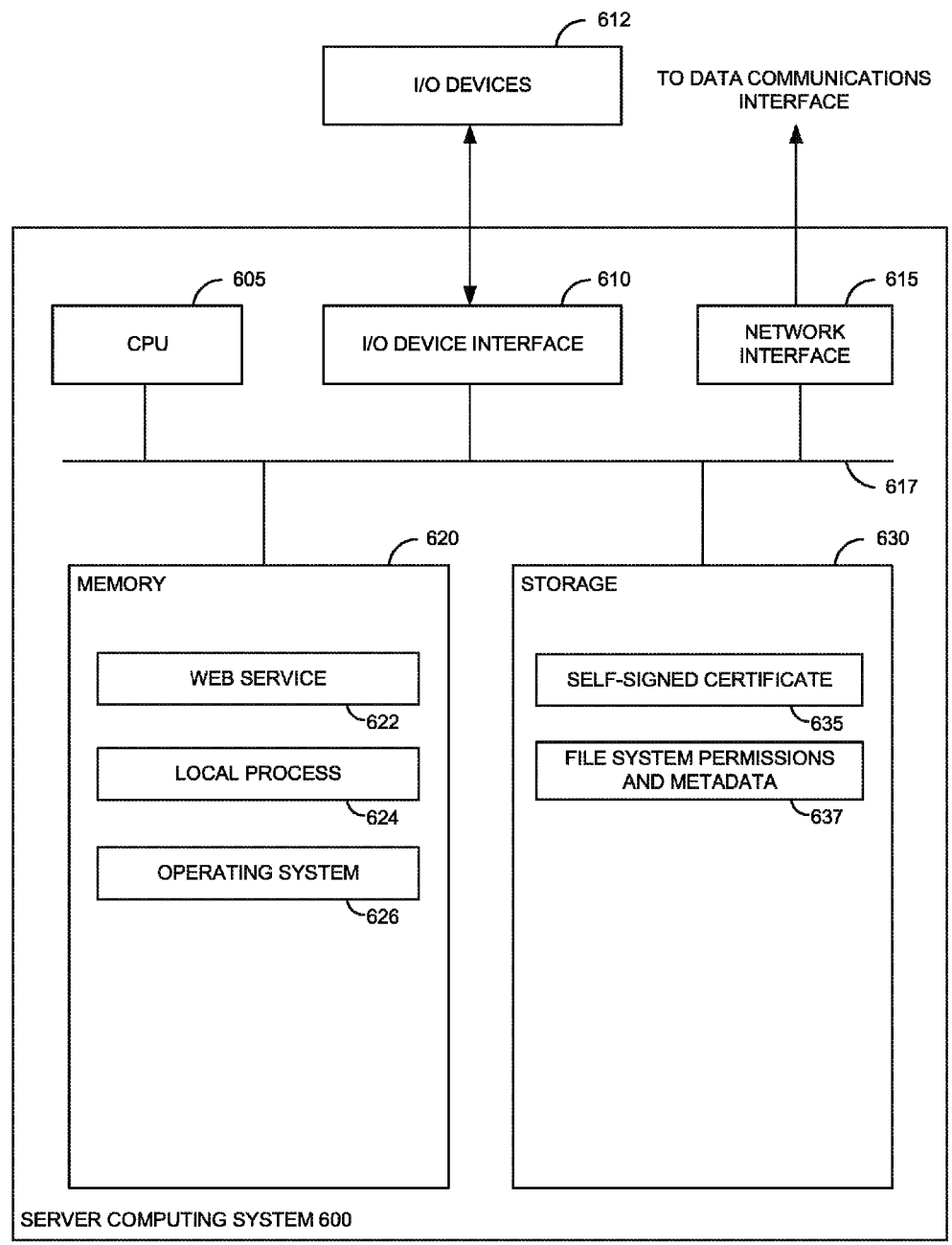
FIG. 6 illustrates an example computing system used to host a web service and local process which accesses the web service, according to one embodiment.

FIG. 6 illustrates an example computing system used to host a web service and local process which accesses the web service, according to one embodiment. As shown, the computing system 600 includes, without limitation, a central processing unit (CPU) 605, a network interface 615, a network interface 615, a memory 620, and storage 630, each connected to a bus 617. The computing system 600 may also include an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

The CPU 605 retrieves and executes programming instructions stored in the memory 620 as well as stores and retrieves application data residing in the memory 630. The interconnect 617 is used to transmit programming instructions and application data between the CPU 605, I/O devices interface 610, storage 630, network interface 615, and memory 620. Note, CPU 605 is included to be representative of a single CPU, multiple CPUs, a single CPU having multiple processing cores, and the like. And the memory 620 is generally included to be representative of a random access memory. The storage 630 may be a disk drive storage device. Although shown as a single unit, the storage 630 may be a combination of fixed and/or removable storage devices, such as fixed disc drives, removable memory cards, optical storage, network attached storage (NAS), or a storage area-network (SAN).

Illustratively, the memory 620 includes a web service 622, a local process 624, and an operating system 626. The storage 630 includes a self-signed certificate 635 and file system permissions 640. As described above, the web service 622 may provide one or more computing applications configured to respond to requests from clients, including requests from local process 624. Further, the web service 622 may require that a requesting client or process authenticate itself before responding to any requests.

In one embodiment, the web service 622 may accept a self-signed certificate 635 presented by the local process 624. However, in addition to performing a cryptographic authentication process using a public key named in self-signed certificate 624, such as a mutual SSL authentication, the web service 622 may validate subject information named in the certificate 635 using file system permissions 640 and metadata information obtained from the operating system 626. As noted above, e.g., the web service 622 may compare a common name listed in the certificate 635 with a username of an owner of the file storing the certificate in the file system permissions 640. Additionally, the web service 622 may compare an organizational unit listed in the certificate 635 with a hostname of the server 600 hosting both the web service 622 and local process 624.

Advantageously, as described, embodiments presented herein provide an authentication mechanism that allows a local process running on a computer server to generate and present a self-signed certificate to authenticate the local process to a web service hosted by the same computer server. In order to trust the self-signed certificate, however, the web service relies on the local process generating a certificate that lists the owner of the local process and the hostname of the computer server in the subject information of the certificate. Further, the local process writes the certificate into a directory that has world-writeable permissions, but which allows only the owner of a file to modify or delete files written into the directory. On a computer server running a UNIX or Linux® based operating system, this is commonly referred to as enabling a "sticky-bit" for the directory. To complete the authentication process, the web service compares file system metadata and system information with the subject information listed in the self-signed certificate.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the invention may be recorded or otherwise encoded on a computer-readable storage medium. Examples of computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media, e.g., a hard-disk drive or any type of solid-state storage device (SSD), on which information is stored. Such computer-readable storage media, when carrying computer-readable instructions that direct the functions of the present invention, are embodiments of the present invention.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Users can access any of the computing resources that reside in the cloud at any time, from anywhere across the Internet. For example, in context of this disclosure, a web service and local process could both be executing on virtual machine instance hosted by a service provider computing cloud.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

What is claimed is:

1. A computer-implemented method for authenticating a process to a web service, the method comprising:
   receiving a self-signed certificate from the process, wherein the web-service and the process are each executing on a first computer server and wherein the self-signed certificate includes subject information identifying an owner of the process;
   identifying a file system directory on the first computer server containing a file storing the self-signed certificate, wherein permissions set for the file system directory permit an owner of a file to modify or delete files written to the file system directory and do not permit file system metadata to be modified; and
   upon determining the subject information identifying the owner of the process matches the file system metadata indicating the owner of the file, considering the process as being authenticated to the web service.

2. The method of claim 1, further comprising, after authenticating the process to the web service, performing, by the web service, one or more requests submitted by the process.

3. The method of claim 1, wherein the file system directory is writeable by any user of the first computer server.

4. The method of claim 1, further comprising, prior to considering the process as being authenticated to the web service, determining that a hostname identified in the subject information matches a hostname of the computer server.

5. The method of claim 1, further comprising, prior to considering the process as being authenticated to the web service, performing a cryptographic authentication process based on a public key identified in the self-signed certificate.

6. The method of claim 1, wherein the file system directory is in a set of one or more trust directories used by the web service to validate digital certificates presented to the web service.

7. A non-transitory computer-readable storage medium storing instructions, which, when executed on a processor, performs an operation for authenticating a process to a web service, the method comprising:
 receiving a self-signed certificate from the process, wherein the web-service and the process are each executing on a first computer server and wherein the self-signed certificate includes subject information identifying an owner of the process;
 identifying a file system directory on the first computer server containing a file storing the self-signed certificate, wherein permissions set for the file system directory permit an owner of a file to modify or delete files written to the file system directory and do not permit file system metadata to be modified; and
 upon determining the subject information identifying the owner of the process matches the file system metadata indicating the owner of the file, considering the process as being authenticated to the web service.

8. The non-transitory computer-readable storage medium of claim 7, wherein the operation further comprises, after authenticating the process to the web service, performing, by the web service, one or more requests submitted by the process.

9. The non-transitory computer-readable storage medium of claim 7, wherein the file system directory is writeable by any user of the first computer server.

10. The non-transitory computer-readable storage medium of claim 7, wherein the operation further comprises, prior to considering the process as being authenticated to the web service, determining that a hostname identified in the subject information matches a hostname of the computer server.

11. The non-transitory computer-readable storage medium of claim 7, wherein the operation further comprises, prior to considering the process as being authenticated to the web service, performing a cryptographic authentication process based on a public key identified in the self-signed certificate.

12. The non-transitory computer-readable storage medium of claim 7, wherein the file system directory is in a set of one or more trust directories used by the web service to validate digital certificates presented to the web service.

13. A computing system, comprising:
 a processor;
 a file system; and
 a memory hosting a web service and a process, both executed by the processor on the computing system, wherein the web service, when executed on the processor, performs an operation for authenticating the process to the web service, the operation comprising:
  receiving a self-signed certificate from the process, wherein the self-signed certificate includes subject information identifying an owner of the process,
  identifying a directory in the file system which contains a file storing the self-signed certificate, wherein permissions set for the file system directory permit an owner of a file to modify or delete files written to the file system directory and do not permit file system metadata to be modified; and
  upon determining the subject information identifying the owner of the process matches the file system metadata indicating the owner of the file, considering the process as being authenticated to the web service.

14. The system of claim 13, wherein the operation further comprises, after authenticating the process to the web service, performing, by the web service, one or more requests submitted by the process.

15. The system of claim 13, wherein the directory is writeable by any user of the computing system.

16. The system of claim 13, wherein the operation further comprises, prior to considering the process as being authenticated to the web service, determining that a hostname identified in the subject information matches a hostname of the computing system.

17. The system of claim 13, wherein the operation further comprises, prior to considering the process as being authenticated to the web service, performing a cryptographic authentication process based on a public key identified in the self-signed certificate.

* * * * *